United States Patent [19]

Beer

[11] Patent Number: 4,599,898
[45] Date of Patent: Jul. 15, 1986

[54] METHOD AND APPARATUS FOR TESTING BALL STRIKING RACKETS

[76] Inventor: Walter Beer, Märkiweg 22, CH-5200 Brugg, Switzerland

[21] Appl. No.: 657,008

[22] Filed: Oct. 2, 1984

[30] Foreign Application Priority Data

Oct. 12, 1983 [CH] Switzerland .................. 5545/83

[51] Int. Cl.⁴ ............................................. G01N 29/00
[52] U.S. Cl. ..................................... 73/579; 73/812; 73/828
[58] Field of Search ..................... 73/579, 812, 828

[56] References Cited

U.S. PATENT DOCUMENTS

| | | | |
|---|---|---|---|
| 3,345,861 | 10/1967 | Heath | 73/579 |
| 3,345,862 | 10/1967 | Rowe | 73/579 |
| 4,077,256 | 3/1978 | Hollander | 73/862.45 |
| 4,109,520 | 8/1978 | Eriksson | 73/862.41 |
| 4,158,962 | 6/1979 | Conoval | 73/862.41 |

Primary Examiner—Howard A. Birmiel
Attorney, Agent, or Firm—Peter K. Kontler

[57] ABSTRACT

The quality of dynamic behavior of tennis rackets and/or selected parts of tennis rackets is ascertained by vibrating the rackets and by monitoring one or more parameters of vibratory movement which are indicative of the quality of the corresponding part of or the entire racket. The rackets and/or selected parts of the rackets can be vibrated at a constant or at a variable frequency for selected intervals of time. The parameter may constitute the slope of the curves denoting the phase of vibration, the frequency of vibration, the width of the resonance frequency of the selected part and/or others.

9 Claims, 6 Drawing Figures

METHOD AND APPARATUS FOR TESTING BALL STRIKING RACKETS

BACKGROUND OF THE INVENTION

The present invention relates to improvements in a method and apparatus for ascertaining the quality of ball striking implements, such as tennis rackets, squash rackets and the like. For the sake of simplicity, the following discussion of the state of art will refer to tennis rackets with the understanding, however, that the method and apparatus of the present invention can be used with equal advantage for ascertaining (i.e., testing) the quality of a wide variety of other types of ball striking implements and/or parts thereof.

At the present time, the quality of tennis rackets is ascertained by subjecting them to a static test. As a rule, the racket is placed on a suitable support so that it is at a standstill, and a selected part of or the entire racket is thereupon subjected to the action of a force which tends to move the racket or a selected part thereof out of a position of rest. The racket (or a selected part thereof) thereby undergoes an elastic (or even plastic) deformation. For example, the application of the force can entail a bending or flexing of the frame and/or a bending or flexing of the strings which constitute the netting of the racket. The ratio P/x of the magnitude of the applied force (P) and the extent of the resulting deflection or deformation (x) of the frame and/or netting is presently considered to constitute a parameter which is indicative of the tension of the netting. This parameter (also called the spring constant) is more accurately indicative of the behavior or action (i.e., quality) of the racket in actual use than another presently contemplated parameter, namely the elasticity of the strings (measured in kp) because such elasticity can be ascertained only during stringing of the netting.

The aforediscussed conventional methods of ascertaining the quality of tennis rackets exhibit a number of serious drawbacks. Thus, the apparatus which can accurately ascertain the value of P/x are rather complex, expensive, prone to malfunction and bulky so that they cannot be readily transported to the location of actual use of the racket. The monitoring of the elasticity of strings in kp and the ascertained value are not a reliable indicator of the quality of a tennis racket because they do not take into consideration the dimensions of the frame and, consequently, such information does not enable the user of the racket to estimate or ascertain the likely behavior of the implement in actual use. Still further, all heretofore known static tests of the quality of tennis rackets exhibit the drawback that the results of measurements are distorted due to friction in the regions where the strings intersect each other. The resulting damping action constitutes a drawback which is characteristic of each static testing procedure. In addition, a static quality measuring procedure does not furnish any indications regarding an essential aspect of the quality of a tennis racket and/or its netting, namely its dynamic behavior during play. Such dynamic behavior exerts a deciding influence upon the length of intervals of contact between the netting and the ball.

OBJECTS AND SUMMARY OF THE INVENTION

An object of the invention is to provide a novel and improved method of testing tennis rackets and/or analogous ball striking implements which avoids the drawbacks but exhibits all advantages of conventional testing methods.

Another object of the invention is to provide a novel and improved apparatus for testing ball striking implements.

A further object of the invention is to provide a method which renders it possible to accurately estimate the dynamic behavior of the implement in actual use.

An additional object of the invention is to provide a method which can be used for testing of selected parts of or entire ball striking implements with the same degree of facility and accuracy.

Still another object of the invention is to provide a method which can furnish short-lasting or more or less permanent indications of the results of the testing operation or operations.

A further object of the invention is to provide a method of the above outlined character which can be practiced by resorting to relatively simple, inexpensive and compact apparatus such as can be readily put to use not only in a plant but also on a tennis court, in the clubhouse or at another location close to the scene of play.

Another object of the invention is to provide a method which can be practiced by professionals or amateurs, which can be practiced with the desired degree of accuracy after a short period of demonstration or training, and which can be used for testing of a wide variety of ball striking implements.

One feature of the invention resides in the provision of a method of ascertaining the quality of ball striking implements, particularly (but not exclusively) tennis rackets and component parts thereof. The method comprises the steps of imparting to a part of the implement (or to the entire implement) a vibratory movement at a selected (constant or variable) frequency for a selected interval of time, and monitoring during such interval that parameter or those parameters of the vibratory movement of the selected part of or the entire implement which is indicative of the quality of the selected part or the entire implement. The vibratory movement imparting step can include periodically applying mechanical, acoustic or other energy impulses to the selected part of or to the entire implement.

The imparting step can include vibrating a selected part of the implement at a varying frequency and the monitoring step can include measuring the phase and recording a characteristic which is indicative of the measured phase. For example, such characteristic may constitute the slope of the curves denoting the phase subsequent to successive passages through zero. Alternatively, the monitoring step (when the selected part is vibrated at a varying frequency) can include measuring the frequency of the selected part of the implement and recording (temporarily or permanently, e.g., by displaying the information or by storing the information on magnetic tape or the like) a characteristic which is indicative of the measured frequency. More specifically, the recording step can include recording the resonance frequency of the selected part of the implement and/or recording the width of the resonance frequency curve of the selected part of the implement.

Still further, the monitoring step can include ascertaining the velocity of propagation of vibratory disturbances in the selected part of the implement, while the selected frequency is constant.

The method can further comprise the step of attaching to the selected part of the implement a mass which is set in vibratory motion in the course of the vibration imparting step. The monitoring step then preferably includes monitoring a parameter of the vibratory movement of such mass.

Another feature of the invention resides in the provision of an apparatus for dynamically ascertaining the quality of ball striking implements, particularly tennis rackets and selected parts thereof. The apparatus comprises means for imparting to an implement or to a selected part of an implement a vibratory movement at a selected frequency for a selected interval of time, and means for monitoring (during such interval of time) that parameter of the vibratory movement of the selected part of or the entire implement which is indicative of its quality.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
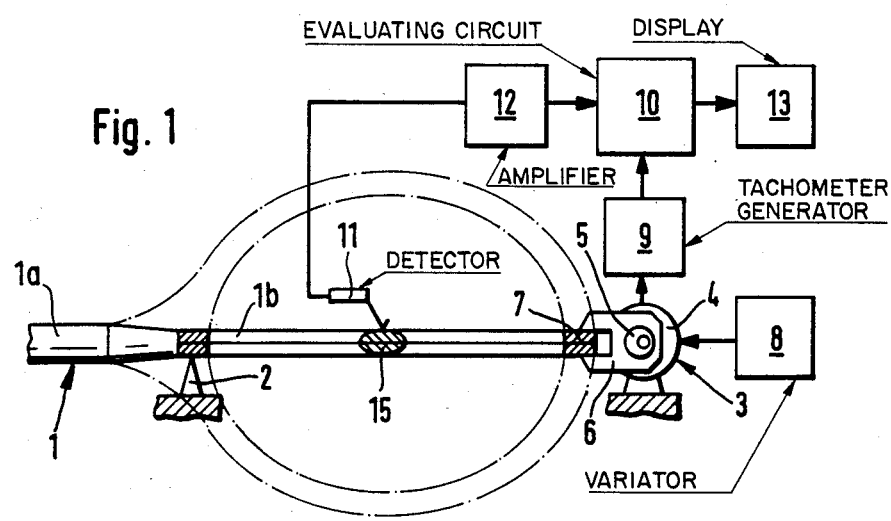
FIG. 1 is a partly sectional schematic and partly diagrammatic view of an apparatus which embodies one form of the invention and can be used for the practice of one embodiment of the improved method.

FIG. 1 shows an apparatus which can be used to test the quality of a ball striking implement in the form of a tennis racket 1. The test involves a determination of the elastic behavior and/or damping characteristics of the implement 1. The apparatus comprises a support 2 which is in engagement with the implement in the region of merger of the handle 1a into the frame 7 and a means 3 for imparting vibratory movements to a selected part of or to the entire implement. The vibration imparting means 3 comprises an electric motor 4 whose output element carries a fixedly connected eccentric disc 5. The latter rotates in the complementary hole or socket of a pair of jaws 6 which grip the adjacent portion of the frame 7. The reference character 8 denotes a variator or another suitable device which can vary the RPM of the motor 4 and hence the frequency of vibratory movement which is imparted to the frame 7.

The RPM of the motor 4 is monitored by a tachometer generator 9 or any other suitable frequency monitoring device whose output transmits corresponding signals to the respective input of a signal comparing stage 10. A detector 11 is provided to ascertain the frequency and/or other characteristics of vibratory movements of the netting 1b of the implement 1. The illustrated detector 11 can constitute a pickup head of the type used in apparatus for recording information on or for retrieving information from magnetic tapes or magnetic discs. The detector 11 transmits signals which are indicative of the frequency and/or amplitude of vibratory movements of the netting 1b, and such signals are amplified by an amplifier 12 prior to transmission to the corresponding input of the signal comparing stage 10.

Figure 2:
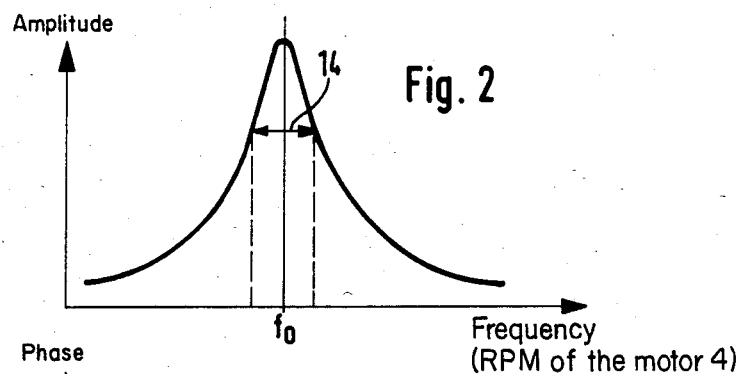
FIG. 2 is an amplitude-time diagram wherein the curve denotes the resonance frequency of the netting of a tennis racket.

When the apparatus of FIG. 1 is in use, the variator 8 is actuated to vary the RPM of the motor 4 within a selected range and to thus vary the frequency of vibratory movements of the netting 1b. The detector 11 detects vibratory movements of maximum amplitude (as at $f_o$ in the diagram of FIG. 2) when the RPM of the motor 4 matches or closely approximates the characteristic frequency of the netting 1b. The output of the signal comparing stage 10 then transmits a signal to a digital display unit 13 which can be said to constitute a means for recording the information pertaining to that parameter of the netting 1b which is indicative of its quality, namely a quality which is important to the user of the implement 1 when the latter is in actual use. Thus, in the apparatus of FIG. 1, the signal comparing stage 10 is designed to transmit a signal to the display unit 13 when the detector 11 ascertains the characteristic frequency $f_o$ of the netting 1b. Such characteristic frequency is an indicator of the elastic behavior (and hence of the quality) of the netting 1b while the implement 1 is caused to strike a ball.

It is clear that the digital display unit 13 can be replaced with other information recording means, such as a printer, a stylus or the like, without departing from the spirit of the invention.

An advantage of the apparatus which is shown in FIG. 1 is that it is surprisingly simple, compact, inexpensive and reliable. Moreover, the apparatus of FIG. 1 can be readily modified in a number of desirable ways, for example, in such a way that the signal comparing stage 10 transmits signals denoting the width 14 (note FIG. 2) of the amplitude of characteristic frequency $f_o$ of the netting 1b during the time interval which is selected by the person in charge of the test to actuate the variator 8, i.e., to change the RPM of the motor 4 within a selected range. The width 14 of the curve denoting the resonance frequency of the netting 1b is indicative of the damping characteristics of the part 1b. Such damping characteristics constitute another parameter which is indicative of the quality of the tested part of the implement 1.

In order to reduce the influence of the mass of the netting 1b upon the results of measurements, it is often desirable to employ a mass 15 of predetermined weight which is separably attached to the netting 1b and whose vibratory movements are monitored by the detector 11. The element 15 then constitutes the actual mass of the vibrating system.

Figure 3:
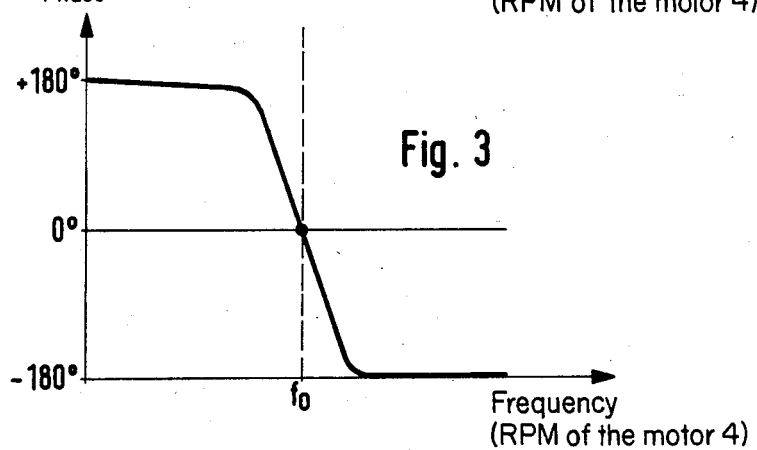
FIG. 3 is a phase-frequency diagram wherein the curve indicates the phase and its slope at the zero point.

It is further possible to design the signal comparing stage (evaluating circuit) 10 in such a way that the digital unit 13 displays signals denoting the phase or the slope of the curve denoting the phase at the time when the mass 15 vibrates at the resonance frequency $f_o$. The phase at the zero point (see FIG. 3) is an indicator of the elastic behavior of the implement 1. The slope of the curve denoting the phase at the zero point is indicative of the damping characteristics of the netting 1b (including friction at the points where the strings of the netting intersect each other).

Figure 4:
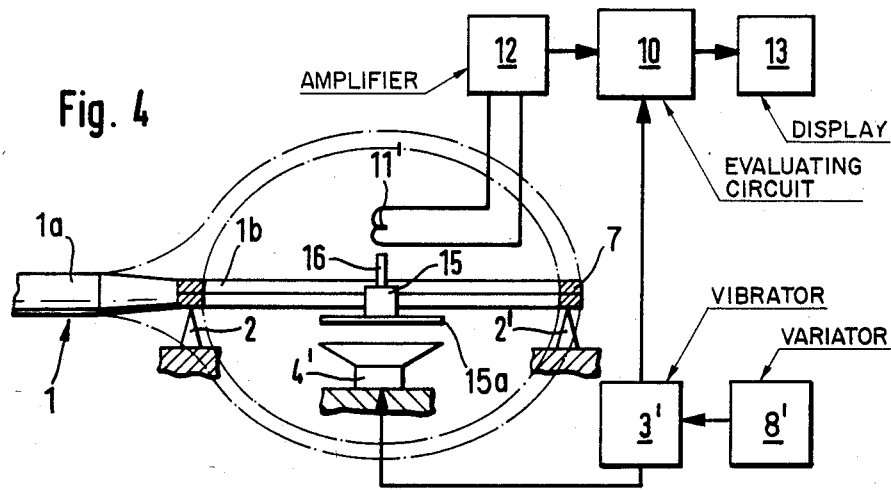
FIG. 4 is a view similar to that of FIG. 1 but showing a second apparatus wherein the energy which is applied to the selected part of an implement is in the form of sound waves.

In the apparatus of FIG. 1, the implement 1 is in contact with the support 2, with the means 3 for imparting vibratory movements thereto, and with the detector 11. FIG. 4 shows a modified apparatus wherein the means 3' for imparting vibratory movements to the netting 1b of the implement 1 is not in actual physical contact with the implement and the detector 11' is also out of contact with the netting and/or the mass 15 thereon. The implement 1 is caused to rest on two supports 2 and 2' which engage the frame 7 at the locus of merger into the handle 1a and at a location which is disposed diametrically opposite the handle 1a. The output element of the means 3' for imparting vibratory movements to the netting 1b is a loudspeaker 4' which is adjacent to but out of contact with the mass 15. The latter is separably affixed to the central portion of the netting 1b. The loudspeaker 4' emits acoustic signals which are caused to vibrate the mass 15 via disc 15a. The means 3' further includes a generator which operates the loudspeaker 4', and the mass 15 is connected with a permanent magnet 16 constituting the core of an induction coil 11' which is the detector of the apparatus of FIG. 4. The generator of the means 3' also transmits signals to the corresponding input of the signal comparing stage 10 another input of which receives signals from the induction coil 11' via amplifier 12. The stage 10 of the apparatus which is shown in FIG. 4 can be said to constitute an evaluating circuit for the signals which are transmitted by the generator of the vibration imparting means 3' and by the detector 11', and its output transmits signals to the digital display unit 13. The reference character 8' denotes a means for varying the excitation frequency of the generator in the means 3'. The detector 11' transmits signals which are indicative of the amplitude of vibratory movements of the netting 1b (mass 15), and the signal which is displayed at 13 is indicative of a parameter that, in turn, denotes the quality of the netting 1b. The mass 15, the permanent magnet core 16 thereon and the disc 15a constitute the actual vibrating mass of the implement 1 which is shown in FIG. 4. The disc 15a can be said to constitute a means for receiving and transmitting forces generated by sound which is emitted by the loudspeaker 4'.

Figure 5:
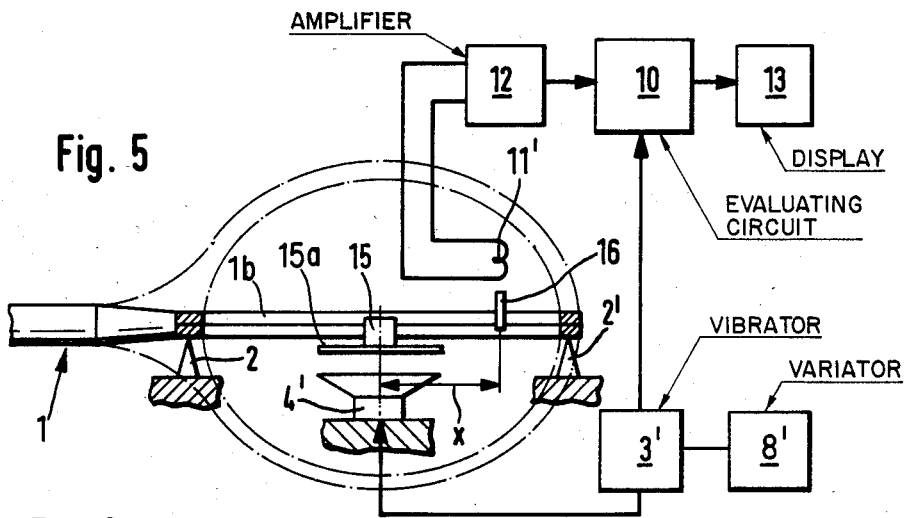
FIG. 5 is a similar view of a third apparatus.

FIG. 5 shows an apparatus which constitutes a modification of the apparatus of FIG. 4 and wherein similar parts are denoted by reference characters corresponding to those employed in FIG. 4. The only difference is that the detector 11' is attached to the netting 1b at a distance x from the mass 15 and loudspeaker 4'. The loudspeaker 4' receives periodic signals from the generator of the vibratory movement imparting means 3', and such signals are transmitted to the disc 15a of the mass 15. The detector 11' transmits signals to the corresponding input of the signal comparing stage 10 via amplifier 12. The stage 10 ascertains the shift in the phase of signals which are received from the generator of the means 3' and amplifier 12.

Figure 6:
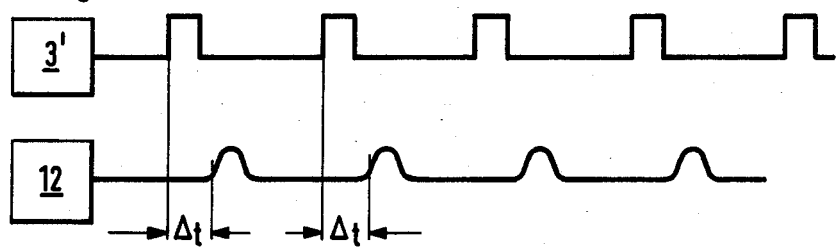
FIG. 6 is a diagram wherein the curves denote the signals which are evaluated by the apparatus of FIG. 5.

The sequences of signals which the stage 10 of FIG. 5 receives from the generator of the means 3' and from the amplifier 12 is shown in FIG. 6. The time differential Δt between the two signals is indicative of the tension (hardness) of the netting 1b.

It is further clear that the improved apparatus can be modified in a number of additional ways without departing from the spirit of the invention. Thus, the means for imparting vibratory movements can constitute any suitable mechanical, acoustic, electronic, electrodynamic, optical (between the ultraviolet and infrared ranges) or electromagnetic system. The same applies for the detector whose configuration and/or mode of operation will depend upon the characteristics of signals which are to be transmitted to the evaluating circuit 10 of the apparatus.

An important advantage of the improved method and apparatus is that, in contrast to the heretofore known static quality measurements, the ascertained parameter or parameters are much more accurately indicative of the behavior of the implement 1 in actual use. Another important advantage of the improved method and apparatus is that they record signals which are obtained by averaging a large number of signals so that the displayed or otherwise recorded information is much more reliable and accurate than the one-shot measurements which are carried out in accordance with heretofore known proposals. The signals which are furnished by the improved apparatus can denote the intervals of actual contact between the ball and the netting 1b when the implement 1 is in the process of striking the ball. Deviations of the frequency or phase from certain values, i.e., different resonance frequencies, different widths of the curves denoting the resonance frequency or different slopes of curves denoting the phase at the zero point, denote different periods of dwell of the ball in actual contact with the netting 1b. Deviations of such parameters from selected optimum values can denote that the implement 1 is less likely to propel the ball in a desired direction.

Another important advantage of the improved method and apparatus is that the implement 1 is not subjected to stresses which could permanently affect its characteristics. For example, and in contrast to heretofore known static testing techniques, the frame 7 and/or the handle 1a of the implement 1 need not be subjected to bending or flexing stresses of a magnitude which could permanently affect the implement. Moreover, the improved method and apparatus can be used for determination of other parameters, such as the elasticity (kP) of the strings and others.

Still another important advantage of the improved method and apparatus is that the test can be completed within a fraction of the time which is required for static testing. This renders it possible to employ the improved apparatus in plants for mass production of ball striking implements to automatically test each of a short or long series of implements at the rate they are being produced. Moreover, the results of tests upon a short or long series of implements can be used to automatically or otherwise remedy the situation when the detected parameters indicate deviations of the quality from an optimum value. The improved apparatus can be used with equal advantage by players and/or coaches and trainers on the court or in the clubhouse.

Without furhter analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of ascertaining at least one of several characteristics of a ball striking implement of the type having a netting consisting of strings and a frame for the netting, particularly a tennis racket and component parts thereof, such characteristics including the elastic behavior of the implement, the elasticity of the strings and the damping action, characteristic frequency and tension of the netting, comprising the steps of attaching a mass to a selected part of the implement to be tested; imparting to the selected part and to the mass a vibratory movement at a selected frequency for a selected interval of time, such movement having a plurality of parameters denoting said characteristics; and monitoring during said interval that parameter of the vibratory movement of the mass and of the selected part of the implement which is indicative of the one characteristic thereof.

2. The method of claim 1, wherein said vibratory movement imparting step comprises periodically applying energy impulses to the mass and the selected part of the implement.

3. The method of claim 1, wherein said imparting step includes vibrating the mass and the selected part of the implement at a varying frequency, said monitoring step including measuring the phase and recording a characteristic which is indicative of the measured phase.

4. The method of claim 4, wherein said characteristic is the slope of the curves denoting the phase subsequent to successive passages through zero.

5. The method of claim 1, wherein said imparting step includes vibrating the mass and the selected part of the implement at a varying frequency, said monitoring step including measuring the frequency of the mass and the selected part of the implement and recording a characteristic which is indicative of the measured frequency.

6. The method of claim 5, wherein said recording step includes recording the resonance frequency of the mass and the selected part of the implement.

7. The method of claim 5, wherein said recording step includes recording the width of the resonance frequency curve of the mass and the selected part of the implement.

8. The method of claim 1, wherein said frequency is constant and said monitoring step includes ascertaining the velocity of propagation of vibratory disturbances in the mass and the selected part of the implement.

9. Apparatus for dynamically ascertaining at least one of several characteristics of a ball striking implement of the type having a netting consisting of strings and a frame for the netting, particularly a tennis racket and component parts thereof, such characteristics including the elastic behavior of the implement, the elasticity of the strings and the damping action, characteristic frequency and tension of the netting, comprising a mass arranged to be attached to a selected part of the implement to be tested; means for imparting to said mass and to said part of the implement a vibratory movement at a selected frequency for a selected interval of time, such movement having a plurality of parameters denoting said characteristics; and means for monitoring during said interval that parameter of the vibratory movement of said mass and said part of the implement which is indicative of said one characteristic thereof.

* * * * *